US008189516B2

(12) United States Patent
Kwon et al.

(10) Patent No.: US 8,189,516 B2
(45) Date of Patent: May 29, 2012

(54) APPARATUS AND METHOD FOR TRANSMITTING/RECEIVING PACKET DATA CONTROL CHANNEL IN AN OFDMA WIRELESS COMMUNICATION SYSTEM

(75) Inventors: Hwan-Joon Kwon, Hwaseong-si (KR); Dong-Hee Kim, Yongin-si (KR); Jin-Kyu Han, Seoul (KR); Yu-Chul Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 461 days.

(21) Appl. No.: 11/541,784

(22) Filed: Oct. 3, 2006

(65) Prior Publication Data

US 2007/0076587 A1   Apr. 5, 2007

(30) Foreign Application Priority Data

Oct. 4, 2005   (KR) .................. 10-2005-0093081

(51) Int. Cl.
*H04W 4/00* (2009.01)
(52) U.S. Cl. ........ 370/329; 370/336; 370/334; 370/337; 370/344
(58) Field of Classification Search .................. 370/203, 370/204, 335, 334, 337, 344, 329
See application file for complete search history.

(56) References Cited

U.S. PATENT DOCUMENTS

| 2003/0171121 | A1* | 9/2003 | Kim et al. ...................... 455/451 |
| 2005/0107036 | A1* | 5/2005 | Song et al. ...................... 455/23 |
| 2005/0157639 | A1* | 7/2005 | Song et al. .................... 370/208 |
| 2005/0195909 | A1* | 9/2005 | Hwang et al. ................ 375/260 |
| 2008/0095223 | A1* | 4/2008 | Tong et al. .................... 375/228 |

FOREIGN PATENT DOCUMENTS

| JP | 2005-203958 | 7/2005 |
| KR | 10-2007-0101000 A | 10/2007 |

* cited by examiner

*Primary Examiner* — Huy D Vu
*Assistant Examiner* — Omer Mian
(74) *Attorney, Agent, or Firm* — Roylance, Abrams, Berdo & Goodman, LLP

(57) ABSTRACT

A method and apparatus for transmitting a packet data control channel in an OFDMA wireless communication system are provided. The method includes dividing control information for user data transmitted during a specific frame into a packet data control channel to be transmitted in a diversity mode and a packet data control channel to be transmitted in an Adaptive Modulation and Coding (AMC) mode; encoding and modulating the packet data control channel to be transmitted in the diversity mode and the packet data control channel to be transmitted in the AMC mode; and mapping the encoded and modulated packet data control channels to sub-carriers, before transmission.

7 Claims, 6 Drawing Sheets

APPARATUS AND METHOD FOR TRANSMITTING/RECEIVING PACKET DATA CONTROL CHANNEL IN AN OFDMA WIRELESS COMMUNICATION SYSTEM

CROSS-REFERENCE TO RELATED PATENT APPLICATION

This application claims the benefit under 35 U.S.C. §119 (a) of a Korean Patent Application filed in the Korean Intellectual Property Office on Oct. 4, 2005 and assigned Serial No. 2005-93081, the entire disclosure of which is hereby incorporated by reference.

BACKGROUND OF THE INVENTION

1. Field of the Invention

The present invention relates to a wireless communication system. More particularly, the present invention relates to an apparatus and method for transmitting/receiving a packet data control channel in an Orthogonal Frequency Division Multiple Access (OFDMA) wireless communication system.

2. Description of the Related Art

A cellular mobile communication system is a typical wireless communication system. The mobile communication system uses a multiple access scheme to simultaneously communicate with a plurality of users. A Time Division Multiple Access (TDMA) scheme, a Code Division Multiple Access (CDMA) scheme, and a Frequency Division Multiple Access (FDMA) scheme are typically used as the multiple access schemes. With the rapid progress of technology, the CDMA mobile communication system has developed from a system providing voice communication into a system capable of transmitting high-speed packet data.

An Orthogonal Frequency Division Multiple Access (OFDMA) scheme has recently been proposed to overcome the limit on code resources used in the CDMA scheme.

The OFDM scheme, a scheme for transmitting data using multiple carriers, is a type of a Multi-Carrier Modulation (MCM) scheme that converts a serial input symbol stream into parallel symbol streams and modulates each of the parallel symbol streams with a plurality of orthogonal sub-carriers, such as sub-carrier channels, before transmission.

A system employing the MCM scheme was first applied to the military High Frequency (HF) radio in the late 1950s, and an Orthogonal Frequency Division Multiplexing (OFDM) scheme for overlapping a plurality of orthogonal sub-carriers. Although the OFDM scheme has developed from the 1970s, it has been limited in its application due to the difficulty in the implementation of orthogonal modulation between multiple carriers. However, since Weinstein et al. showed in 1971 that OFDM modulation/demodulation can be efficiently processed using Discrete Fourier Transform (DFT), the OFDM scheme has rapidly developed. In addition, the advent of a scheme of using a guard interval and inserting a cyclic prefix (CP) symbol in the guard interval reduces the influence of multi-path and delay spread on the system.

Advances in technological developments have led to the popular application of the OFDM scheme to digital transmission technologies such as Digital Audio Broadcasting (DAB), Digital Television (TDV), Wireless Local Area Network (WLAN), and Wireless Asynchronous Transfer Mode (WATM), among others. That is, the OFDM scheme, which was not popularly used due to its high hardware complexity, can now be implemented with the recent development of various digital signal processing technologies including Fast Fourier Transform (FFT) and Inverse Fast Fourier Transform (IFFT). Although the OFDM scheme is similar to the conventional Frequency Division Multiplexing (FDM) scheme, it maintains orthogonality between sub-carriers during data transmission. This facilitates optimal transmission efficiency during high-speed data transmission. Since the OFDM scheme has high frequency efficiency and is robust against multi-path fading, it can obtain optimal transmission efficiency during high-speed data transmission. As the OFDM scheme overlaps frequency spectrums, it has high frequency efficiency, and is robust against frequency selective fading and multi-path fading. With the use of a guard interval, the OFDM scheme can reduce inter-symbol interference (ISI), can design an equalizer with a simple hardware structure, and is robust against impulse noise. Therefore, the OFDM scheme tends to be actively applied to the communication system.

In wireless communication, the high-speed, high-quality data service is generally hindered due to the channel environment. The channel environment in the wireless communication undergoes a change due to power variation of a received signal caused by Additive White Gaussian Noise (AWGN) and fading, shadowing, a Doppler effect caused by movement and frequency velocity change of a terminal, and interference caused by other users and a multi-path signal. The above factors must be overcome in order to support the high-speed, high-quality data service in the wireless communication. The transmission scheme and technology used in the common OFDM system to overcome the fading phenomenon may be roughly divided into two schemes: an Adaptive Modulation and Coding (AMC) scheme and a diversity scheme.

The AMC scheme adaptively adjusts a modulation scheme and a coding scheme according to a channel variation of a downlink. A terminal can detect Channel Quality Information (CQI) of the downlink by measuring a Signal-to-Noise Ratio (SNR) of a received signal. That is, the terminal feeds back the CQI of the downlink to a base station through an uplink. The base station estimates a channel state of the downlink using the CQI of the downlink fed back from the terminal. The base station adaptively adjusts a modulation scheme and a coding scheme according to the estimated channel state. The AMC scheme applies a higher-order modulation scheme and a higher coding rate for an improved channel state, and applies a lower-order modulation scheme and a lower coding rate for a worse channel state. Compared with the conventional scheme depending on the fast power control, the AMC scheme increases adaptability to a time-varying characteristic of the channel, thereby improving the average system performance.

The diversity technique is a scheme suitable for traffic that should not be adapted to a channel environment of a particular user, similar to the common control channel, or the traffics susceptible to delay, like the real-time traffics.

Generally, a wireless channel undergoes various changes in the time axis, and even in the frequency domain, has a good channel state in some regions and a bad channel state in other regions. In this channel environment, if it is not possible to adapt transmission data to a channel for a particular user, it is inevitable that from the viewpoint of each receiving terminal, the transmission data is received in a good channel state in some cases and received in a bad channel state in other cases. The diversity technique is suitable to be used for such environment or such traffic. The goal of the diversity technique is to allow the transmission data to evenly experience the good channels and the bad channels if possible. If particular transmission data, such as a particular data packet, is received in a bad channel state, the packet will not be demodulated successfully. Therefore, in terms of reception performance, if one packet has some modulation symbols experiencing bad channels and other modulation symbols experiencing good channels, the packet can be demodulated using the symbols experiencing the good channels.

FIG. 1 is a diagram illustrating a format of one frame in a conventional OFDM wireless communication system.

Referring to FIG. 1, the horizontal axis represents a time axis, and the vertical axis represents a frequency axis. Reference numeral 110 represents a bandwidth of the system. As illustrated, the system bandwidth 110 is composed of a plurality of sub-carriers 130. Each of the sub-carriers 130 is composed of one or a plurality of OFDM symbols in the time axis. Reference numeral 120 illustrates that one frame is composed of several OFDM symbols.

In the OFDM system, system resources are 2-dimensionally composed of a frequency domain and a time domain. That is, if the unit where one physical channel is transmitted in the time axis is defined as a frame (hereinafter also referred to as a "packet transmission interval"), the frame is commonly composed of a plurality of OFDM symbols. Since each of the OFDM symbols is composed of a plurality of sub-carriers in the frequency axis, the resource defined in one frame has a 2-dimensional resource form composed of a plurality of OFDM symbols in the time axis and a plurality of sub-carriers in the frequency axis. In the 2-dimnesional resource, the minimum unit such as one sub-carrier in one OFDM symbol, is generally called a time-frequency bin (hereinafter referred to as a "TF bin"), and the TF bin is a unit where one modulated symbol is transmitted during actual physical channel transmission.

Reference numeral 140 represents a Downlink MAP (DL MAP) transmission interval. The DL MAP 140 is used to transmit control information for user data transmitted during the frame, and has the same meaning as that of a packet data control channel. As illustrated in FIG. 1, the DL MAP 140 is transmitted in a diversity mode. In the diversity transmission mode, sub-carriers constituting a particular transmission channel are scattered over the full band. Particular positions of the sub-carriers are predefined between a base station and a terminal.

The diversity transmission mode is used to transmit the DL MAP so that a frequency diversity gain may be obtained from the diversity transmission mode. Reference numeral 150 represents a user data transmission interval where user data is transmitted in the diversity transmission mode. Reference numeral 160 represents a user data transmission interval where user data is transmitted in an AMC transmission mode. The "AMC transmission mode" refers to the transmission mode where sub-carriers constituting a particular transmission channel are localized. The AMC transmission mode means a transmission mode that can obtain a gain when a data transmitter selects a good-channel band in the frequency domain and transmits user data using the selected band. Reference numerals 161 to 166 illustrate data transmitted to different users with the AMC transmission scheme.

As described above, the conventional OFDM wireless communication system transmits the DL MAP 140, such as packet data control information, through the diversity transmission mode. The diversity transmission mode can expect performance improvement because it can obtain a diversity gain when the transmitter does not have correct information on the wireless channel environment. However, when the transmitter has correct information on the wireless channel environment, the method for transmitting packet data control information through the diversity transmission mode is not preferable in the environment where a good-channel band can be selected and allocated to each user, such as in the environment where data should be transmitted in the AMC transmission mode.

Accordingly, there is a need for an improved system and method for transmitting packet data control information separately for a diversity transmission mode and an AMC transmission mode.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus and method to efficiently transmit/receive a packet data control channel in an OFDM wireless communication system.

An object of an exemplary embodiment of the present invention is to provide a packet data control channel transmission/reception apparatus and method capable of increasing the efficiency of resource utilization by transmitting the packet data control channel separately for a diversity transmission mode and an AMC transmission mode in an OFDM wireless communication system.

According to one aspect of an exemplary embodiment of the present invention, there is provided a method for transmitting a packet data control channel in an OFDMA wireless communication system. Control information for user data transmitted during a specific frame is divided into a packet data control channel to be transmitted in a diversity mode and a packet data control channel to be transmitted in an Adaptive Modulation and Coding (AMC) mode. The packet data control channel to be transmitted in the diversity mode and the packet data control channel to be transmitted in the AMC mode are encoded and modulated. The encoded and modulated packet data control channels are mapped to sub-carriers, before transmission.

According to another aspect of an exemplary embodiment of the present invention, there is provided an apparatus for transmitting a packet data control channel in an OFDMA wireless communication system. The apparatus comprises a controller, an encoder, a modulator and a sub-carrier. The controller divides control information for user data transmitted during a specific frame into a packet data control channel to be transmitted in a diversity mode and a packet data control channel to be transmitted in an Adaptive Modulation and Coding (AMC) mode. The encoder independently encodes the packet data control channel to be transmitted in the diversity mode and the packet data control channel to be transmitted in the AMC mode. The modulators independently modulate the packet data control channel to be transmitted in the diversity mode and the packet data control channel to be transmitted in the AMC mode. The sub-carrier mapper maps the encoded and modulated packet data control channels to sub-carriers under the control of the controller.

According to yet another aspect of an exemplary embodiment of the present invention, there is provided a method for receiving a packet data control channel in an Orthogonal Frequency Division Multiple Access (OFDMA) wireless communication system. A signal transmitted from a transmitter is received and a cyclic prefix (CP) is removed from the received signal. A Fast Fourier Transform (FFT) process is performed on the CP-removed signal. Sub-carriers mapped to packet data control channels transmitted separately for a diversity mode and an Adaptive Modulation and Coding (AMC) mode for the FFT-processed signal are selected. The packet data control channels are demodulated, the demodulated packet data control channels are decoded and packet data control information is output.

According to yet another aspect of an exemplary embodiment of the present invention, there is provided an apparatus for receiving a packet data control channel in an Orthogonal Frequency Division Multiple Access (OFDMA) wireless communication system. The apparatus comprises a cyclic prefix (CP) remover, a Fast Fourier Transform (FFT), a sub-carrier selector, a demodulator and a decoder. The CP remover receives a signal transmitted from a transmitter, and removes a CP from the received signal. The Fast Fourier Transform (FFT) unit performs an FFT process on the CP-removed signal. The sub-carrier selector selects sub-carriers mapped to packet data control channels transmitted separately for a diversity mode and an Adaptive Modulation and Coding (AMC) mode for the FFT-processed signal. The demodulator demodulates the packet data control channels and a decoder decodes the demodulated packet data control channels, and outputs packet data control information.

BRIEF DESCRIPTION OF THE DRAWINGS

The above and other exemplary objects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An exemplary embodiment of the present invention proposes a scheme for dividing packet data control channel information into two types before transmission. The packet data control information is to be transmitted in a diversity mode and packet data control information is to be transmitted in an AMC mode.

Figure 1:
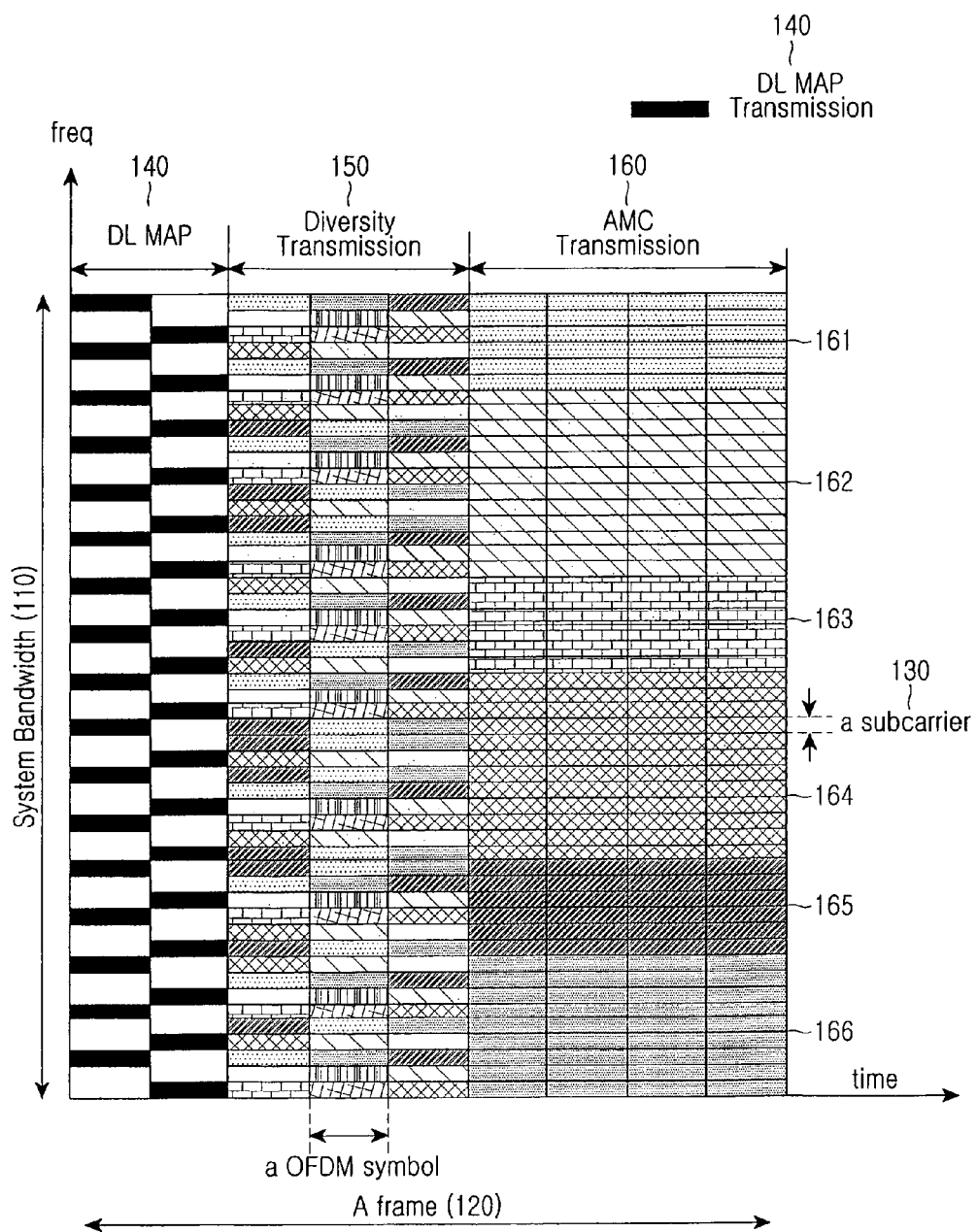
FIG. 1 is a diagram illustrating a format of one frame in a conventional OFDM wireless communication system.
Figure 2:
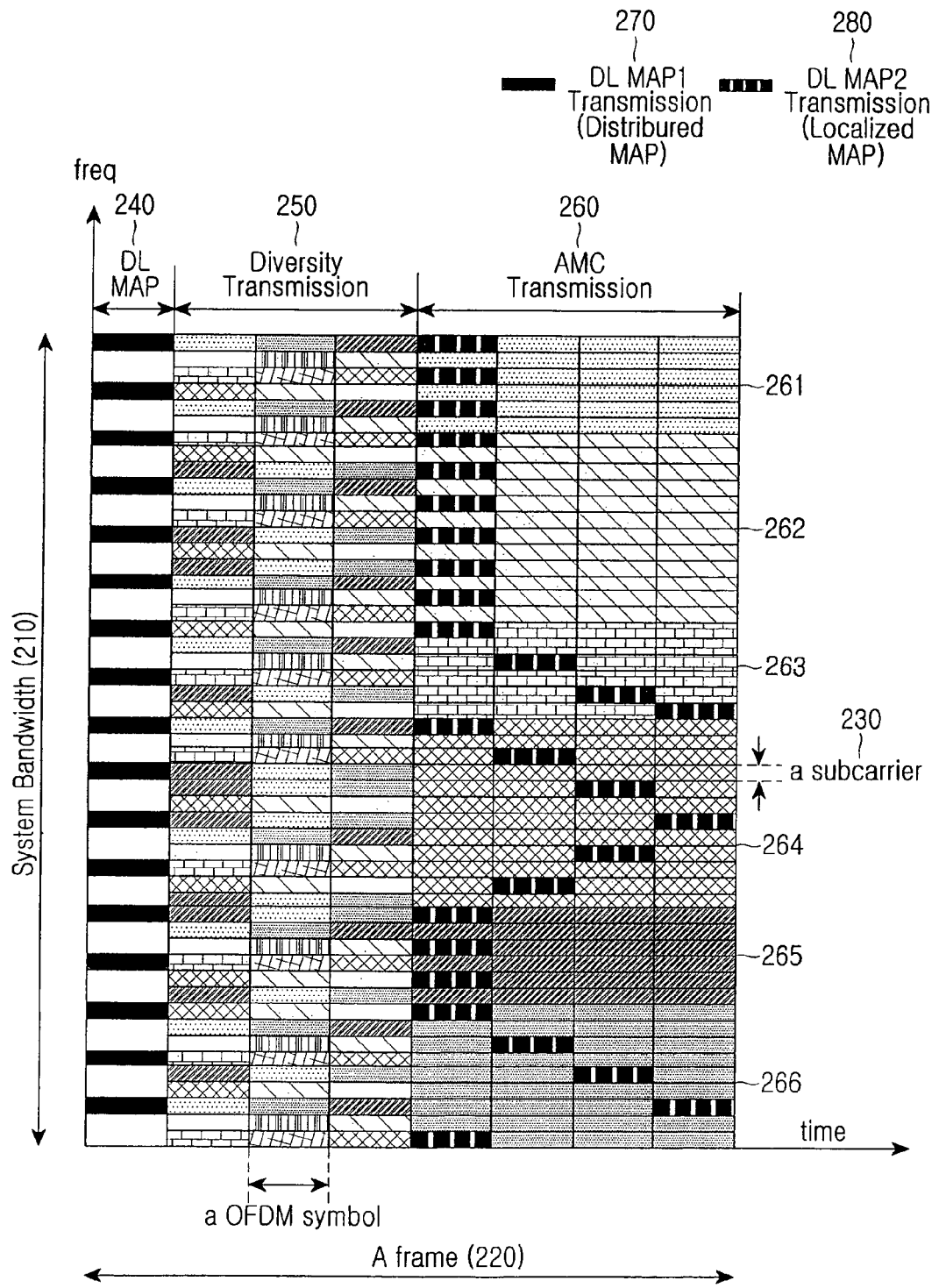
FIG. 2 is a diagram illustrating an exemplary frame where a packet data control channel (DL MAP) is formed according to an exemplary embodiment of the present invention.

FIG. 2 is a diagram illustrating an exemplary frame where a packet data control channel (DL MAP) is formed according to an exemplary embodiment of the present invention.

In FIG. 2, the horizontal axis represents a time axis and the vertical axis represents a frequency axis. Reference numeral 210 represents a bandwidth in an OFDMA wireless communication system. It can be noted that the system bandwidth 210 is composed of a plurality of sub-carriers 230. Each of the sub-carriers 230 is composed of one or a plurality of OFDM symbols in the time axis. Reference numeral 220 illustrates one frame composed of several OFDM symbols. Reference numeral 240 represents a transmission interval of a DL MAP #1 (downlink MAP or packet data control channel) 270. The DL MAP #1 270 refers to a packet data control channel that is transmitted in a diversity transmission mode, in the control information for user data transmitted during the frame. The diversity transmission mode refers to a transmission mode in which sub-carriers constituting a particular transmission channel are scattered over the full band. Reference numeral 250 represents a user data transmission interval in which user data is transmitted in the diversity transmission mode.

When the DL MAP #1 270 is transmitted in the transmission interval of the DL MAP 240, a packet data control channel to be transmitted in the diversity mode, in the control information for user data transmitted during a predetermined frame, is mapped thereto.

Reference numeral 260 represents a user data transmission interval in which user data is transmitted in an AMC transmission mode. The AMC transmission mode refers to the transmission mode in which sub-carriers constituting a particular transmission channel are localized. The AMC transmission mode is a transmission scheme that can obtain a gain when a data transmitter selects a good-channel band in the frequency domain and transmits user data using the selected band. Reference numerals 261 to 266 illustrate data transmitted to different users with the AMC transmission scheme. It can be noted from reference numerals 261 to 266 that a DL MAP #2 280 is included in each AMC channel, such as one block composed of consecutive sub-carriers. The DL MAP #2 280 represents packet data control information for user data transmitted through the AMC transmission block 260. The. DL MAP #2 280 represents packet data control information transmitted in the AMC mode proposed in an exemplary embodiment of the present invention.

When the DL MAP #2 280 is mapped to the AMC transmission block 260, predetermined symbols are punctured from the AMC sub-bands composed of at least one sub-carrier, and a packet data control channel to be transmitted in the AMC mode in the control information for the user data transmitted during a specific frame is mapped to the punctured sub-bands.

Figure 3:
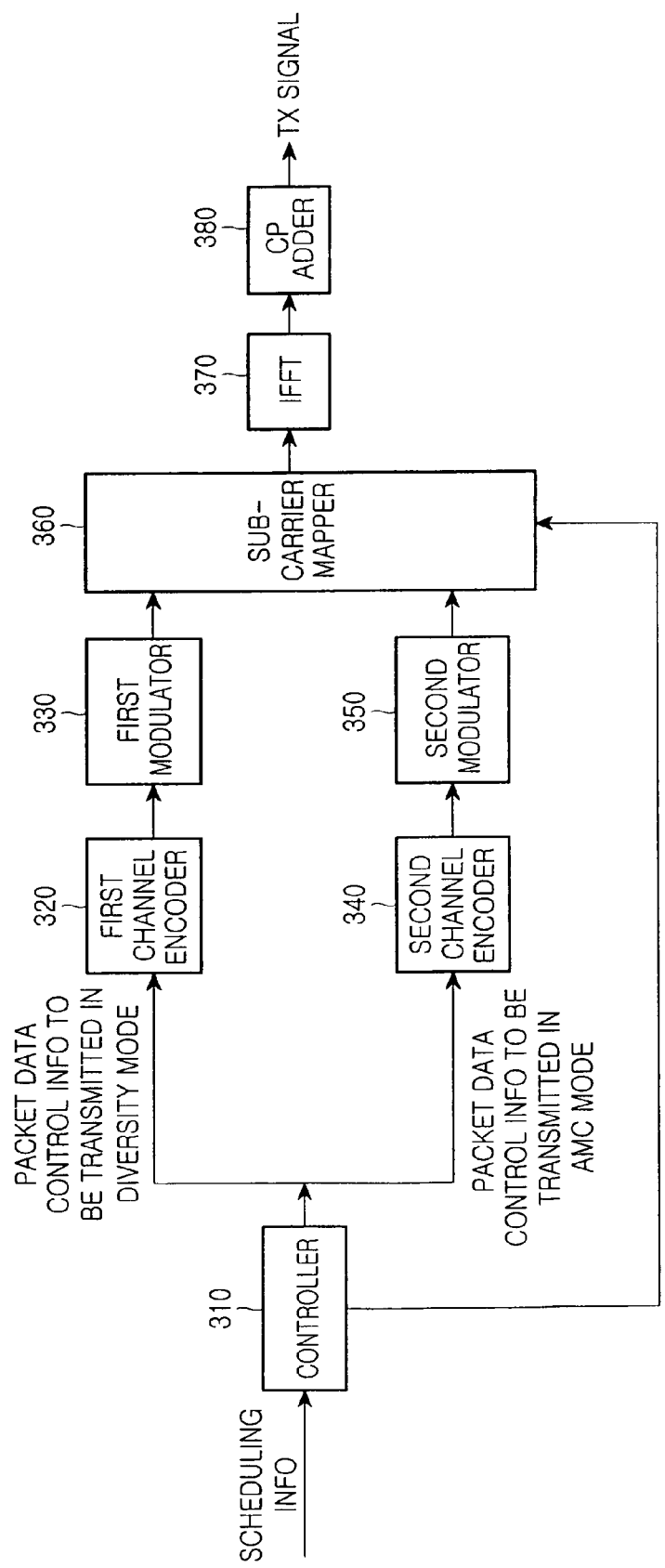
FIG. 3 is a block diagram illustrating a structure of a base station transmitter according to an exemplary embodiment of the present invention.

FIG. 3 is a block diagram illustrating a structure of a base station transmitter according to an exemplary embodiment of the present invention.

Referring to FIG. 3, a controller 310 receives scheduling information by means of a scheduler (not shown).

For every transmission interval, the scheduler determines the terminal to which it will transmit data, how much resource it will use to transmit the data, and in which data transmission mode (diversity mode or AMC mode) it will transmit data. The determined information is commonly called "scheduling information." Table 1 below illustrates an example of the scheduling information. Referring to Table 1, the Terminal Identifier indicates a terminal identifier predefined between a base station and a terminal indicates to which user the data transmitted in this transmission interval will be transmitted. Data Block Size indicates a size (the number or bits) of data transmitted in this transmission interval. Transmission Mode indicates whether a transmission mode used for a transmission interval is a diversity transmission mode or an AMC transmission mode. MCS (Modulation and Coding Scheme) level indicates information on a modulation scheme and a coding scheme used in this data transmission interval. Resource Used indicates time sub-carrier resources used for data transmission in this transmission interval. Table 1 is an example of the scheduling information. The scheduling information may include other information in addition to the information displayed in Table 1 according to system configuration.

TABLE 1

| Scheduling Information | Number of bits |
|---|---|
| Terminal Identifier | 12 |
| Data Block Size | 10 |
| Transmission Mode (Diversity/AMC) | 1 |
| MCS level | 2 |
| Resource Used | 5 |

The controller 310 divides packet data control information into packet data control information that is to be transmitted in the diversity mode and packet data control information that is to be transmitted in the AMC mode depending on the scheduling information. The packet data control information to be transmitted in the diversity mode is input to a first channel encoder 320 and a first modulator 330. The packet data control information to be transmitted in the diversity mode undergoes a coding process and a modulation process in the first channel encoder 320 and the first modulator 330, and then is input to a sub-carrier mapper 360.

The packet data control information to be transmitted in the AMC mode is input to a second channel encoder 340 and a second modulator 350. The packet data control information to be transmitted in the AMC mode undergoes the second channel encoder 340 and the second modulator 350, and then is input to the sub-carrier mapper 360.

Under the control of the controller 310, the sub-carrier mapper 360 maps the modulation symbols output from the first modulator 330 and the second modulator 350 to two-dimensional sub-carriers in the time-frequency domain. The mapping is performed so the output of the first modulator 330 assumes the form of the DL MAP #1 270 of FIG. 2, and the output of the second modulator 350 assumes the form of the DL MAP #2 280 of FIG. 2. The output of the sub-carrier mapper 360 undergoes an Inverse Fast Fourier Transform (IFFT) process in an IFFT unit 370. A cyclic prefix (CP) is added to the output of the IFFT unit 370 in a CP adder 380, and then transmitted to a receiver.

Figure 4:
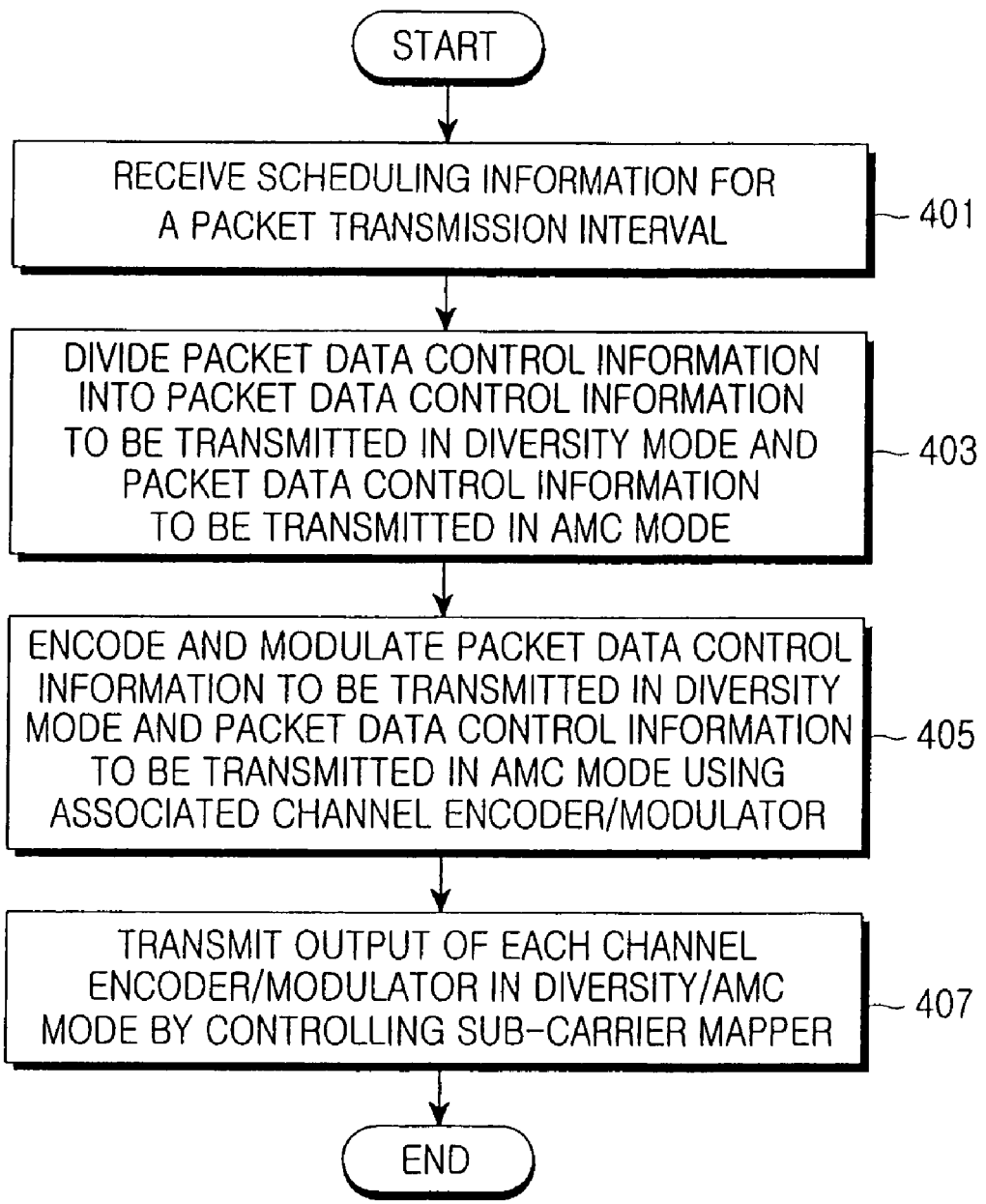
FIG. 4 is a flowchart illustrating a transmission operation of a transmitter in an OFDMA wireless communication system according to an exemplary embodiment of the present invention.

FIG. 4 is a flowchart illustrating a transmission operation of a transmitter in an OFDMA wireless communication system according to an exemplary embodiment of the present invention.

In step 401 of FIG. 4, a controller 310 receives scheduling information for a packet transmission interval, such as this frame, from a scheduler. In step 403, the controller 310 divides the packet data control information into packet data control information to be transmitted in a diversity mode and packet data control information to be transmitted in an AMC mode using the scheduling information. In step 405, the controller 310 inputs the packet data control information to be transmitted in the diversity mode and the packet data control information to be transmitted in the AMC mode to predetermined channel encoders 320 and 340, and predetermined modulators 330 and 350, respectively. The packet data control information to be transmitted in the diversity mode and the packet data control information to be transmitted in the AMC mode undergo a coding process and a modulation process in the channel encoders 320 and 340 and the modulators 330 and 350. The packet data control information is then input to a sub-carrier mapper 360. In step 407, the controller 310 controls the sub-carrier mapper 360 such that the outputs of the modulators 330 and 350 can be transmitted in the diversity mode and the AMC mode, respectively. That is, the controller 310 controls the sub-carrier mapper 360 such that the packet data control information to be transmitted in the diversity mode assumes the form of the DL MAP #1 270 of FIG. 2 and the packet data control information to be transmitted in the AMC mode assumes the form of the DL MAP #2 280 of FIG. 2.

Figure 5:
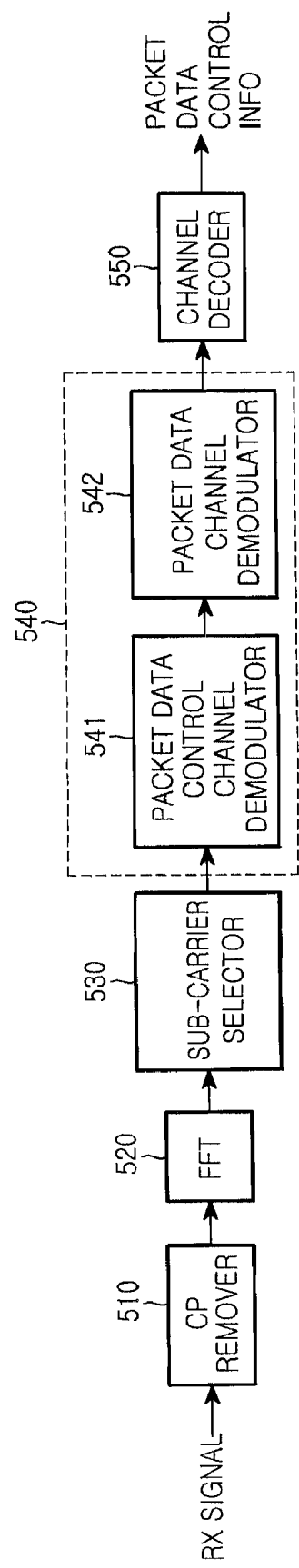
FIG. 5 is a block diagram illustrating a structure of a terminal receiver according to an exemplary embodiment of the present invention.

FIG. 5 is a block diagram illustrating a structure of a terminal receiver according to an exemplary embodiment of the present invention.

Referring to FIG. 5, a receiver receives the signal transmitted from a transmitter at a CP remover 510. The CP remover 510 removes a CP from the transmitted signal and outputs the CP-removed signal to a Fast Fourier Transform (FFT) unit 520. The FFT unit 520 performs an FFT process on the received CP-removed signal, and then outputs the FFT-processed signal to a sub-carrier selector 530. The sub-carrier selector 530 selects sub-carriers mapped to a packet data control channel which is formed as illustrated in FIG. 2. The sub-carrier selector 530 then outputs the selected sub-carriers to a demodulator 540. The demodulator 540 is comprised of a packet data control channel demodulator 541 and a packet data channel demodulator 542. The packet data control channel demodulator 541 demodulates a packet data control channel, and the packet data channel demodulator 542 demodulates a packet data channel. The output of the demodulator 540 is input to a channel decoder 550. A demodulation process of the demodulator 540 will be described in detail with reference to FIG. 6. The channel decoder 550 performs a channel decoding process on the output of the demodulator 540, and outputs packet data control information.

Figure 6:
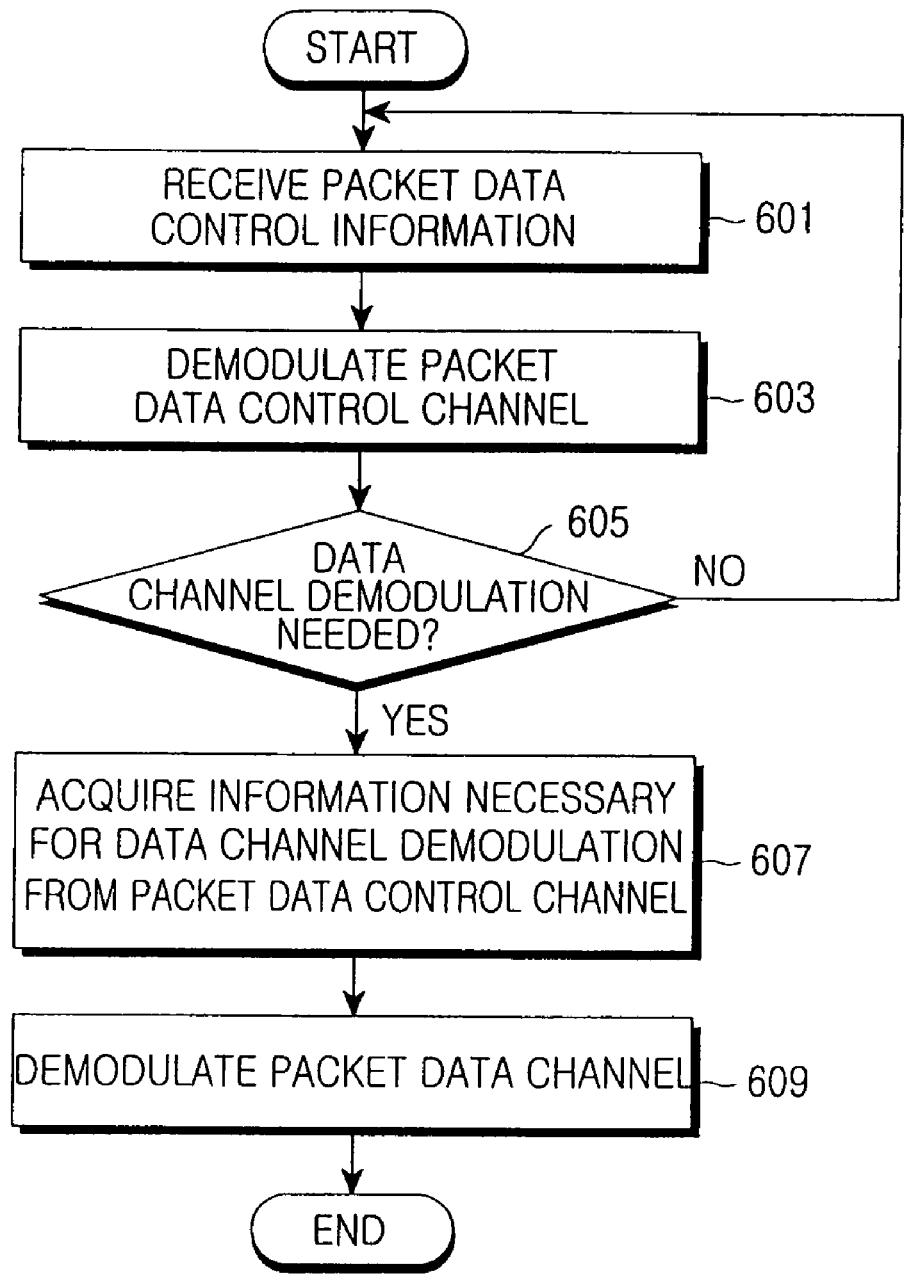
FIG. 6 is a flowchart illustrating a reception operation of a terminal according to an exemplary embodiment of the present invention.

FIG. 6 is a flowchart illustrating a reception operation of a terminal according to an exemplary embodiment of the present invention.

In step 601 of FIG. 6, a receiver of the terminal receives packet data control channels transmitted separately in a diversity mode and an AMC mode. In step 603, a packet data control channel demodulator 541 demodulates the received packet data control channels.

After demodulating the packet data control channels, the terminal determines in step 605 whether there is a need for data channel demodulation. That is, the terminal determines whether the base station has transmitted data to the terminal itself in this data transmission interval. If it is determined that there is no data transmitted thereto, the terminal proceeds to the next data transmission interval. However, if it is determined in step 605 that there is data transmitted thereto, such as if there is a need to demodulate a data channel, the terminal acquires information necessary for the data channel from the packet data control channel, and delivers the acquired information to a packet data channel demodulator 542 in step 607. In step 609, the packet data channel demodulator 542 demodulates the data channel output from the packet data control channel demodulator 541, and outputs demodulated data. The demodulated data becomes packet data transmitted in the diversity mode or the AMC mode.

The OFDM wireless communication system, according to an exemplary embodiment of the present invention, may efficiently transmit/receive a packet data control channel.

In addition, the OFDM wireless communication system, according to an exemplary embodiment of the present invention, transmits packet data control channels separately for the diversity transmission mode and the AMC transmission mode, thereby increasing efficiency of resource utilization.

Further, the OFDM wireless communication system can maximize the system capacity using the packet data control channel transmission/reception apparatus and method according to an exemplary embodiment of the present invention.

Moreover, the OFDM wireless communication system can transmit/receive reliable packet data control channels using the packet data control channel transmission/reception apparatus and method proposed in the exemplary embodiments of the present invention.

The present invention can also be embodied as computer readable codes on a computer readable recording medium. The computer readable recording medium is an data storage device that can store data which can thereafter be read by a computer system. Examples of the computer readable recording medium include, but are not limited to, read-only memory (ROM), random-access memory (RAM), CD-ROMs, magnetic tapes, floppy disks, and optical data storage devices. Also, functional programs, codes and code segments for accomplishing the present invention can be easily construed as within the scope of the invention by programmers skilled in the art to which the invention pertains.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for receiving a packet data control channel in an Orthogonal Frequency Division Multiple Access (OFDMA) wireless communication system, the method comprising:

receiving a signal including a first packet data, a first packet data control information for the first packet data, a second packet data, and a second packet data control information for the second packet data in a single frame from a transmitter, and removing a cyclic prefix (CP) from the received signal, wherein the first packet data control information and the first packet data are received in the diversity mode and the second packet data control information and the second packet data are received in the Adaptive Modulation and Coding (AMC) mode;

performing a Fast Fourier Transform (FFT) process on the CP-removed signal;

demodulating the first packet data control information and the second packet data control information for the FFT-processed signal; and decoding the demodulated first and second packet data control information, generating a single packet data control information from the first and second packet data control information, and outputting the single packet data control information.

2. The method of claim 1, wherein the decoding of the demodulated first and second packet data control information and outputting packet data control information further comprises:

receiving the first packet data control information transmitted in the diversity mode and the second packet data control information transmitted in the AMC mode;

demodulating the first and second packet data control information;

determining whether there is a need for demodulation of a packet data information; and if there is a need for demodulation of the packet data information, acquiring the packet data control information necessary for the data information from the first and second packet data control information, demodulating the data information using the acquired packet data control information, and outputting packet data.

3. The method of claim 1, wherein predetermined symbols are punctured from AMC sub-bands used for transmitting the second packet data composed of at least one sub-carrier and the second packet control information is mapped to the punctured AMC sub-bands.

4. An apparatus for receiving a packet data control channel in an Orthogonal Frequency Division Multiple Access (OFDMA) wireless communication system, the apparatus comprising:

a cyclic prefix (CP) remover for receiving a signal including a first packet data, a first packet data control information for the first packet data, a second packet data, and a second packet data control information for the second packet data in a single frame from a transmitter, and removing a CP from the received signal, wherein the first packet data control information and the first packet data are received in the diversity mode and the second packet data control information and the second packet data are received in the transmitted in an Adaptive Modulation and Coding (AMC) mode;

a Fast Fourier Transform (FFT) unit for performing an FFT process on the CP-removed signal;

a demodulator for demodulating the first packet data control information and the second packet data control information from the FFT-processed signal; and a decoder for decoding the demodulated first and second packet data control information, and outputting packet data control information.

5. The apparatus of claim 4, wherein the demodulator comprises:

a packet data control channel demodulator for receiving the first packet data control information transmitted in the diversity mode and the second packet data control information transmitted in the AMC mode, and for demodulating the first and second packet data control informations; and a packet data channel demodulator for acquiring the packet data control information necessary for a packet data information from the first and second packet data control information, for demodulating the packet data information using the acquired packet data control information, and for outputting packet data.

6. The apparatus of claim 4, wherein predetermined symbols are punctured from AMC sub-bands used for transmitting the second packet data composed of at least one sub-carrier and the second packet control information is mapped to the punctured AMC sub-bands.

7. A non-transitory computer readable medium having embodied thereon a computer program for executing a method of receiving a packet data control channel in an Orthogonal Frequency Division Multiple Access (OFDMA) wireless communication system, the method comprising:

removing a cyclic prefix (CP) from the received signal including a first packet data, a first packet data control information for the first packet data, a second packet data, and a second packet data control information for the second packet data in a single frame from a transmitter, wherein the first packet data control information and the first packet data are received in the diversity mode and the second packet data control information and the second packet data are transmitted in the received in an Adaptive Modulation and Coding (AMC) mode;

performing a Fast Fourier Transform (FFT) process on the CP-removed signal;

demodulating the first packet data control information and the second packet data control information from the FFT-processed signal; and decoding the demodulated first and second packet data control information, and outputting packet data control information.

* * * * *